United States Patent [19]

Petroff

[11] 4,105,361
[45] Aug. 8, 1978

[54] MACHINE TOOL HAVING QUILL CONTROL MEANS

[76] Inventor: Robert J. Petroff, 1703 S. Main St., Lombard, Ill. 60148

[21] Appl. No.: 747,531

[22] Filed: Dec. 6, 1976

[51] Int. Cl.² ........................................... B23B 47/22
[52] U.S. Cl. .................................................... 408/130
[58] Field of Search ..................................... 408/130

[56] References Cited

U.S. PATENT DOCUMENTS

| 2,648,238 | 8/1953 | Raney | 408/130 X |
| 2,657,595 | 11/1953 | Shaff | 408/130 |
| 3,389,413 | 6/1968 | Van Den Kieboom | 408/130 |

Primary Examiner—Leonidas Vlachos
Attorney, Agent, or Firm—Fitch, Even, Tabin & Luedeka

[57] ABSTRACT

A machine tool unit is disclosed having a housing supporting a quill and rotatable tool support spindle for longitudinal movement under fluid pressure, and including control means disposed eccentrically of the quill and connected thereto so as to control axial feed movement of the quill without exerting a bending moment on the quill which would cause directional deviation of the quill and spindle during feed movement.

9 Claims, 5 Drawing Figures

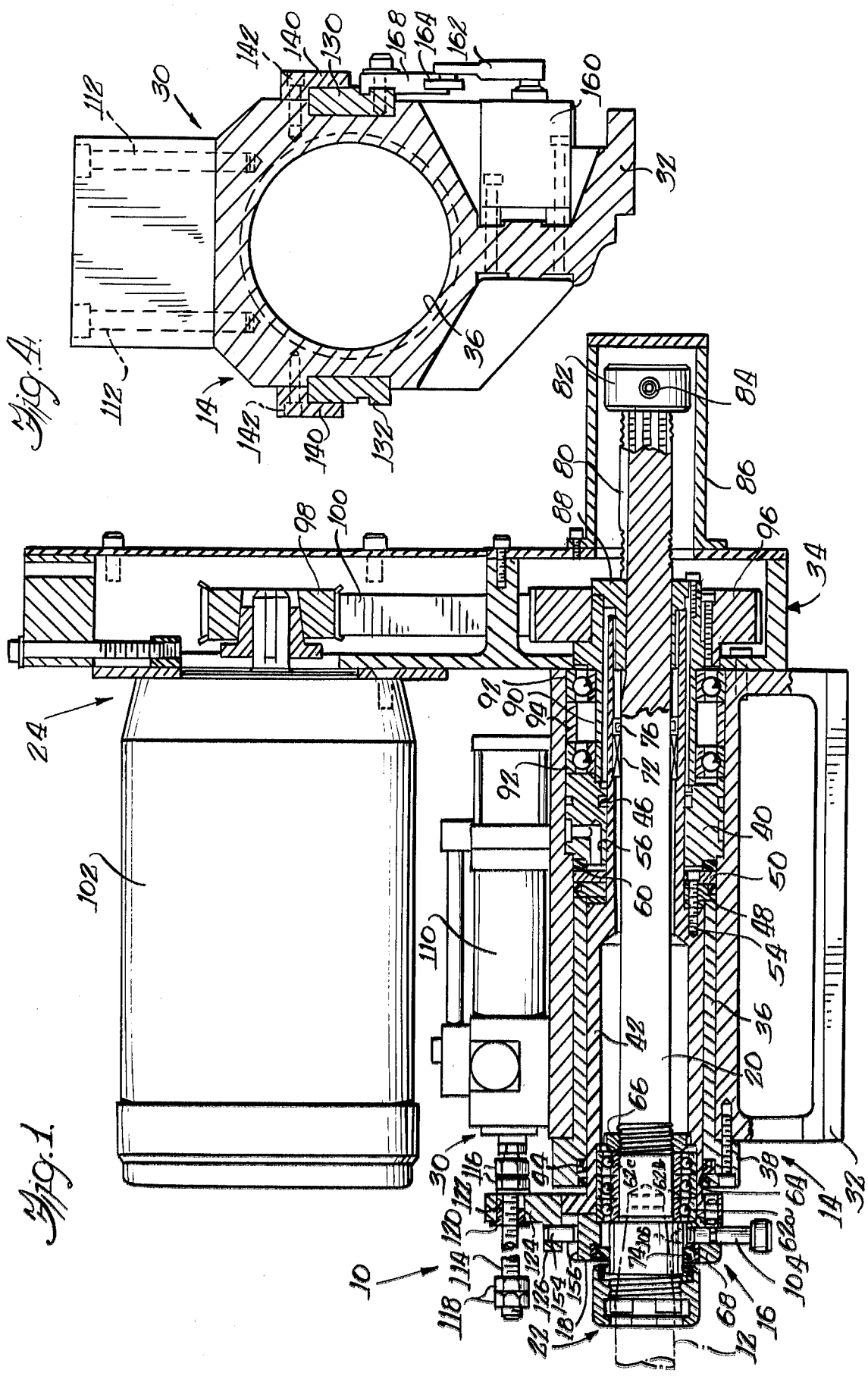

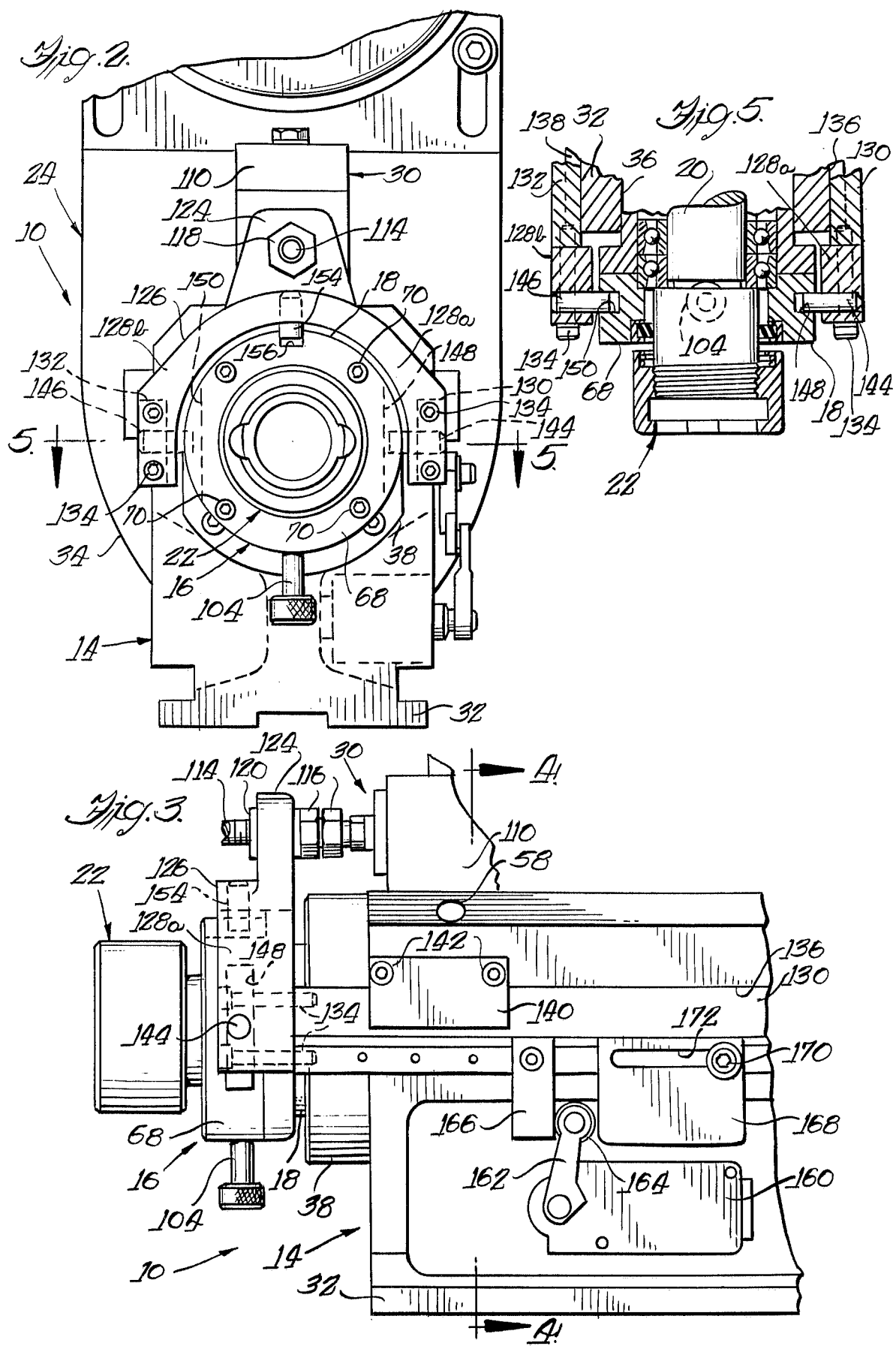

MACHINE TOOL HAVING QUILL CONTROL MEANS

The present invention relates generally to machine tools and the like, and more particularly to a machine tool unit having control means disposed eccentrically of an axially movable quill and spindle assembly to control axial feed movement of the quill without effecting directional deviation of the quill and spindle.

It is known in the manufacture of articles which require precise machining of one or more holes to employ automatic or semi-automatic machine tools which advance a tool to a workpiece in a rapid advance movement, feed the tool axially into the workpiece to effect the desired operation, and thereafter retract the tool to a position spaced from the workpiece preparatory to the next machining cycle. Such machine tools are particularly useful in automated production wherein a workpiece is moved through successive work stations, certain of which entail precision machining operations.

Known apparatus found particularly suitable for automatic and semi-automatic operation in precision machining employ axially movable quills which rotatably support spindles for axial movement therewith. The spindles serve to support tools through tool holders. Fluid pressure, typically pneumatic pressure, is employed to advance the quill axially to the workpiece whereafter the tool is controllably fed into the workpiece to effect the desired machining. To obtain a precise rate of feed of the tool into the workpiece, and also to prevent high impact of the tool against the workpiece, means in the form of hydraulic check units are generally provided in cooperative association with the quill to apply a resistive control force acting against the forward axial movement of the quill caused by the penumatic feed pressure. By selective adjustment of the hydraulic check unit, a desired rate of feed of the tool may be obtained to complete the machining operation whereafter the tool may be rapidly retracted. See for example U.S. Pat. No. 3,663,138, dated May 16, 1972.

In the noted U.S. Pat. No. 3,663,138, the hydraulic check controls displacement of hydraulic fluid pressure acting directly on a piston carried by the quill so that the resistive force acts axially of the quill. Frequently, however, machine tools are such that the resistive force applied to the quill acts parallel and eccentric to the axis of the quill and spindle. In those machine tools wherein the force resisting forward advance of the quill and spindle is applied eccentrically to the axis of the quill, a bending moment is created on the quill which tends to cause the quill and associated spindle and tool to deviate from their intended axial direction with the result that the tool "dives" away from the intended axial direction and does not produce a precision machining operation. For example, in such a machine tool adapted for drilling a hole in a workpiece, diving of the quill and drill supporting spindle results in a hole having an axis which is not coincident with the intended axis of movement of the drill tool. The problems that result therefrom are readily apparent. For example, where a hole is drilled as the lead hole for a subsequent tapping operation and the axis of the lead hole is not in precise axial alignment with the axis of movement of the quill, the tapping tool will follow the misaligned hole, with the result that the tapping tool may be damaged and the tapped hole will not be in the proper location. If a drilled or precision bored hole is for the purpose of receiving a rod or shaft in an accurately located position, misalignment of the hole due to deviation of the tool will result in improper positioning of the rod or shaft.

One of the primary objects of the present invention is to provide a machine tool wherein control means are operatively connected to an axially movable quill in a manner to apply a resistive force to the quill which acts eccentrically to the axis of the quill for selectively controlling the axial speed of the quill without creating a bending moment on the quill as would result in deviation or "diving" of the quill and associated tool-carrying spindle from their intended axial direction. A more particular object of the present invention is to provide control means for selectively controlling axial movement of a spindle carrying quill in a machine tool wherein the control means includes a control link disposed eccentric and parallel to the axis of the quill. The control link is connected to the quill through a yoke haing a pair of guide bars connected thereto which are slidable in guide slots in the support housing such that the bending moment produced on the yoke by the control link to control axial feed of the quill is not applied to the quill but instead is imparted to the housing through the guide bars.

A feature of the present invention lies in the provision of a pin-slot connection between the yoke and the quill such that the resistive force of the control link is operative to control the forward axial movement of the quill without subjecting the quill to a transverse bending moment.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a partial longitudinal sectonal view of a machine tool having the present invention embodied therein;

FIG. 2 is a front end view of the machine tool of FIG. 1;

FIG. 3 is a partial side elevational view of the machine tool of FIG. 1;

FIG. 4 is a partial transverse sectional view taken substantially along the line 4—4 of FIG. 3, looking in the direction of the arrows, and FIG. 5 is a partial horizontal sectional view taken substantially along the line 5—5 of FIG. 2 and showing the connection of the control yoke to the quill.

Referring now to the drawings, and in particular to FIG. 1, the present invention is shown as being embodied in a machine tool which, in the illustrated embodiment, takes the form of a drill unit indicated generally at 10. The drill unit 10 with which the present invention will be described is for illustration purposes only, it being understood that the present invention may be embodied in other machine tools which employ axially movable quills and tool support spindles as will be described in greater detail hereinafter.

The illustrated drill unit 10 is adapted to effect controlled axial movement of a tool, a portion of a drill being illustrated in phantom at 12, from a retracted position relative to a housing, indicated generally at 14, toward a workpiece (not shown) and thereafter back to the retracted position. A quill and spindle assembly, indicated generally at 16, is supported by the housing 14 and includes a quill 18 mounted for axial movement within the housing 14 and a spindle 20 rotatably mounted within the quill 18 and axially fixed thereto. The spindle 20 has conventional chuck means, indicated generally at 22, at its outer end to receive and support the shank of the drill tool 12.

The drill unit 10 includes drive means, indicated generally at 24, operatively associated with the spindle 20 for rotating the spindle and drill 12. As will be described more fully below, the quill and spindle assembly 16 is adapted to be advanced in an axial direction outwardly from the housing 14 by fluid pressure means acting axially on the quill 18 while the spindle 20 is simultaneously rotated by the drive means 24. In accordance with the present invention, the drill unit 10 is provided with control means, indicated generally at 30, supported by the housing 14 and cooperative with the quill and spindle assembly 16 to control the speed of forward movement or feed of the quill, and therefore the drill tool 12, relative to the workpiece during a drilling operation without exerting a bending moment on the quill which would cause deviation of the tool from its intended axial movement during the drilling operation. The control means 30 may alternatively be described as controlling the feed of the tool 12 without causing the tool to "dive" during a machining operation.

The housing 14 includes a base portion 32 and an upstanding drive housing portion 34 which is secured to the base portion 32 and partially encloses the drive means 24. The housing base portion 32 defined a stepped longitudinal bore 36 which receives and supports an annular quill nose bearing 38 within its forward end and receives and supports an annular rear bearing 40 within its enlarged diameter rearward end. The quill nose bearing 38 and rear bearing 40 cooperate to slidingly receive and support a tubular portion 42 of the quill 18 such that the quill may be moved axially relative to the housing base portion 32. Suitable annular seals 44 and 46 are interposed between the tubular quill portion 42 and the quill nose bearing 38 and annular rear bearing 40, respectively, to prevent fluid pressue leakage as is known.

Piston means in the form of an annular piston 48 is supported on the quill 18 adjacent an annular shoulder surface 50 thereon by means of an annular piston cap 52 and a plurality of screws, one of which is indicated at 54. The piston 48 cooperates with the quill nose bearing 38 and rear bearing 40 , respectively, to define pressure chambers on opposite sides of piston 48 between the quill 18 and the bore 36 in the housing 14. Fluid pressure, typically pneumatic pressure, intorduced through a fluid pressure port 56 in housing 14 is operative to effect axial movement of the quill 18 outwardly of the housing 14, while introduction of fluid pressure through a suitable fluid pressure port 58 (FIG. 3) is operative to move the quill 18 from an axially extended position to a rearward position wherein the piston cap 52 abuts an annular cushion 60. It will be understood that the fluid pressure is provided from a suitable source of fluid pressure (not shown), and the ports 56 and 58 are selectively connected for either fluid pressure inflow or exhaust to facilitate axial movement of the quill 18. The fluid pressure ports 56 and 58, and the source of fluid pressure for axially moving the quill and spindle assembly 16 constitute fluid pressure means operative to effect axial movement of the quill toward the workpiece.

As noted, the spindle 20 is rotatably mounted in the quill 18 and is axially fixed thereto for axial movement therewith. In the illustrated embodiment, three bearings 62a, b and c have their outer races received within a counterbore 64 in the tubular portion 42 of quill 18 and have their inner races secured on the spindle 20 through a lock nut 66. The outer races of the bearings 62a–c are retained within the counterbore 64 by an annular bearing cap 68 secured to the forward end of the tubular portion 42 of the quill by a plurality of circumferentially spaced screws, as indicated at 70 in FIG. 2. A suitable roller bearing 72 rotatably supports the spindle 20 adjacent the rearward end of the tubular porton 42 of the quill 18. Annular seals 74 and 76 are disposed between the quill 18 and the spindle 20 adjacent the forward end and rear bearing 72 to protect the bearings 62a–c and 72 from contaminants and the like.

The end of the spindle 20 opposite the chuck 22 is splined at 80, a rear portion of the spline being externally threaded to threadedly receive a stop member 82 which is adjustable along the threaded spline and may be locked in a selected position thereon through a locking screw 84. The stop member 82 is encased by a housing shield 86 which is suitably secured to the drive housing 34. The stop nut 82 limits longitudinal or axial outward movement of the spindle and quill assembly 16 relative to the housing 14 by engagement with a spline driver 88 having a splined connection to the spindle to allow axial movement of the spline relative to the spline driver while being adapted to effect driving rotation of the spindle.

The spline driver 88 is carried by a pulley adapter sleeve 90 which is supported within the stepped bore 36 of the base housing 32 through a pair of identical bearings 92. The bearings 92 are maintained in axial spaced relation by a spacer sleeve 94 and are retained against the rear bearing 40 by the drive housing 34. The pulley adapter sleeve 90 has a driven pulley 96 secured thereon, the driven pulley 96 being interconnected to a drive pulley 98 through an endless drive belt 100. The drive pulley 98 is mounted on the drive shaft of a suitable drive motor 102 which may comprise a pneumatic or electric drive motor capable of providing continuous rotation to the spindle 20 during a drilling operation, as is known. To prevent rotation of the spindle relative to the quill 18, as when mounting a drill within the chuck 22, a spindle lock plunger 104 is mounted on the bearing cap 68 and is axially adjustable for selective engagement with a recess 106 in the spindle.

As noted above, in precision machining operations such as precision drilling, it is a conventional practice to rapidly advance the drill to a position adjacent the workpiece and thereafter effect a controlled forward feed of the drill into the workpiece. The latter controlled feed is necessary because of a generally irregular feed which may be obtained with pneumatic fluid pressure feed systems and also to prevent the drill bit from striking the workpiece with heavy impact during rapid advance movement of the tool. The control means 30 of the present invention controls forward feed movement of the quill and spindle assembly 16 and associated drill tool 12 during drilling of the workpiece so that an optimum machining operation is obtained. In accordance with the present invention, the control means 30 is interconnected to the quill 18 so as to control the rate of forward feed of the drill 12 into the workpiece without exerting a bending moment on the quill which could cause deviation of the spindle 20 and drill 12 from their intended axial directions whereby to prevent "diving" of the drill during drilling of the workpiece. This has been found particularly necessary in machining operations such as precision drilling to insure that the axis and location of the drilled hole is in true axial alignment with the intended axial direction of the tool support spindle and associated quill.

The control means 30 includes a control cylinder assembly 110, which may alternatively be defined as a hydraulic check assembly, mounted on the housing 14 as through screws 112 (FIG. 4). The control cylinder assembly 110 is of known design, one such being commercially available from Bellows-Valvoir Division of IBEC under the tradename "Hydro-Check". The control cylinder assembly 110 has control link means in the form of an axially outwardly extending longitudinally movable control link 114 which is threaded along its length to accommodate pairs of stop nuts 116 and 118 which are selectively lockable along the length of the control link. The control cylinder 110 is mounted on the housing 14 such that the axis of the control link 114 is parallel and eccentric to the longitudinal axis of the quill and spindle assembly 16, the axis of the control link of the illustrated embodiment lying in a vertical plane containing the longitudinal axis of the spindle 20. In the illustrated embodiment, the control link 114 takes the form of a cylindrical rod which is slidingly received through an annular bushing 120 retained within a suitable opening 122 in an upstanding arm portion 124 of a yoke 126. The control link may take other forms suitable for the intended purpose. As will become more apparent hereinbelow, the connection of the yoke 126 to the control link 114 provides a lost motion connection therebetween.

The yoke 126 defines a pair of leg portions 128a and 128b which are formed to partially encircle the annular bearing cap 68 on the forward end of the quill 18. The yoke 126 is secured to and supported by a pair of parallel spaced guide bars 130 and 132 through suitable screws 134. The guide bars 130 and 132 are longitudinally slidable within longitudinally extending guide slots or channels 136 and 138, respectively, formed in the housing 14 such that the longitudinal axes of the guide bars 130 and 132 lie in a plane containing the longitudinal axis of the spindle 20, which plane is perpendicular to the plane containing the axes of the spindle and the control link 114. A retainer plate 140 is mounted on each side of the housing 14 through screws 142 so as to retain the guide bars 130 and 132 within their respective guide slots 136 and 138. In this manner, the yoke 126 and its associated guide bars 130 and 132 are supported by the housing 14 for longitudinal sliding movement along an axis generally coincident with the axis of the spindle 20.

The yoke 126 is interconnected to the spindle 18 through a pair of axially aligned diametrically opposed connecting pins 144 and 146 supported by the leg portions 128a and 128b, respectively, of the yoke. The radial inner ends of the connecting pins 144 and 146 are received in sliding relation within generally vertically disposed slots 148 and 150, respectively, formed in the annular bearing cap 68. The connecting pins 144, 146 and associated vertical slots 148, 150 form pin-slot connections between the yoke and the spindle 18. The pins 144 and 146 may be either cylindrical or may have flats formed on their peripheral surfaces for sliding engagement with the associated vertical slots 148 and 150 in the bearing cap 68. A guide pin or key 154 is supported by the yoke 126 and extends downwardly into a guide slot 156 in the bearing cap 68 to prevent rotation of the quill 18 about its longitudinal axis.

As noted, the control cylinder 110 is of conventional known design and includes means (not shown) in the form of a hydraulic check to control or limit the axial outward movement of the control link 114. By selective adjustment of the stop nuts 116 and 118 on the control link 114, forward extension of the quill and spindle assembly 16 will cause the upper arm portion 124 of the yoke 126 to engage the nuts 118 when the quill reaches a preselected position outwardly from the housing 14. At the preselected point in travel of the yoke and spindle assembly, the control cylinder assembly 110 is operative to check the forward speed of the quill and spindle assembly through the application of a restrictive force acting on the quill through the yoke 126. Conventionally, the stop nuts 118 are adjusted on the control link 114 such that the control means 30 applies a restrictive force on the quill and spindle assembly just prior to engagement of the drill with the workpiece so as to control the rate of feed of the drill into the workpiece. The restrictive force applied to the quill through the yoke 126 acts on the yoke eccentrically of the axis of the quill in a manner to create a bending moment on the yoke. By mounting the yoke on the guide bars 130 and 132, the bending moment created on the yoke is transmitted through the guide bars to the housing 14, rather than to the quill, with the connecting pins 144 and 146 serving to apply a restrictive force on the quill which acts along the longitudinal axis of the quill and associated spindle 20. In this manner, the bending moment created on the yoke 126 is not transferred to the quill, with the result that the quill 18, spindle 20 and drill 12 are not caused to deviate from their intended axial feed directions during a drilling operation.

FIG. 3 shows the positioning and control of a limit switch 160 which may comprise a portion of a control circuit for effecting automatic or semi-automatic operation of the drill unit 10 when pneumatic pressure is employed to reciprocate the quill 18. The switch 160 has a pivotally mounted actuating arm 162 the outer end of which carries a rotatable contact roller 164 which is engageable by a cam interlock plate 166. and a forward limit cam plate 168. The cam interlock plate 166 and cam limit plate 168 are mounted on the guide bar 130, the limit cam plate 168 being adjustable relative to the guide bar so that the cam interlock plate 166 and forward limit plate 168 may be employed to sense the position of the quill and spindle assembly 16.

Having thus described a preferred embodiment of the drill unit 10 in accordance with the present invention, it can be seen that the introduction of suitable fluid pressure through the pressure port 56 is operative to move the quill and spindle assembly 16 forwardly from the housing 14, with the control means 30 being operative to control the forward axial speed of the quill and spindle in the aforedescribed manner. After completing a drilled hole, the drill may be retracted from the workpiece and the associated quill and spindle assembly returned to its initial position within the housing 14 by introduction of suitable fluid pressure into the flow passage 58. It will be understood that the drill unit 10 may include control circuit means for effecting automatic or semi-automatic cycling of the quill and spindle assembly 16 through the use of limit switches and control switches operatively associated with the quill and spindle assembly 16 to effect controlled operation of the drill unit in a known manner. The control circuit means for effecting automatic or semi-automatic control of the drill unit 10 do not, per se, form part of the present invention, it being understood that such systems are known to those skilled in the art.

Thus, in accordance with the present invention, a machine tool is provided which incorporates control check means to control the feed of a quill and tool support spindle through the application of a restrictive force on the quill and spindle, which restrictive force acts along the longitudinal axis of the quill and spindle so as not to apply a bending moment to the quill as would cause the tool carried by the spindle to deviate from its intended axial direction of feed. The application of a restrictive force to the quill and spindle through a control means mounted eccentric and parallel to the longitudinal axis of the quill and spindle without subjecting the tool to a bending moment is of particular importance in precision machining.

While a preferred embodiment of the present invention has been illustrated and described, it will be understood to those skilled in the art that changes and modifications may be made therein without departing from the invention in its broader aspects. Various features of the invention are defined in the following claims.

What is claimed is:

1. In a machine tool adapted for controlled axial movement of a tool from a retracted position toward a workpiece, said machine tool including a housing, a quill supported by said housing and axially movable relative to said housing, a spindle rotatably carried by said quill and axially fixed thereto for movement therewith, said spindle having means at its outer end to support a tool, said quill and spindle defining forward ends thereon movable outwardly from said housing upon selective axial movement of said quill and spindle, means for rotating the spindle, and means operatively associated with said quill to effect axial movement of said quill and spindle toward said workpiece, the combination therewith comprising control means supported by said housing and operatively associated with said quill to control the speed of axial movement thereof toward said workpiece, said control means including control link means disposed eccentric to the axis of said quill, first means interconnecting said control link means to said quill adjacent its said outer end to facilitate control of the longitudinal speed thereof toward said workpiece, and second means interconnecting said first means to said housing so as to prevent exertion of a bending moment on said quill be said control link means in a direction tending to cause deviation of said spindle from its intended axial direction during longitudinal movement thereof, said first means interconnecting said control link means to said quill including a yoke member connected to said control link means, said second means having a pair of guide bars fixedly secured to said yoke member, said guide bars being longitudinally slidable within corresponding guide slots in said housing, and said yoke being connected to said quill through a sliding connection such that a resistive force applied to said yoke by said control means acts substantially axially of said quill, with bending moments created on said yoke acting on said housing through said guide bars.

2. In a machine tool adapted for controlled axial movement of a tool from a retracted position toward a workpiece, said machine tool including a housing, a quill supported by said housing and axially movable relative to said housing, a spindle rotatably mounted within said quill and axially fixed thereto, said spindle having means at its outer end to receive and support the shank of a tool, means for rotating the spindle, and fluid pressure means operatively associated with said quill and operative to effect axial movement of said quill toward said workpiece, the combination therewith comprising control means supported by said housing and cooperative with said quill to control the speed of movement thereof toward said workpiece, said control means including control link means disposed eccentric to the axis of said quill, means interconnecting said control link means to said quill so as to prevent exertion of a bending moment on said quill in a direction intending to cause deviation of said spindle from its said axial movement while simultaneously controlling the longitudinal speed thereof, said last mentioned means including a yoke member connected to said control link means and having a pair of guide bars fixedly secured thereto, said guide bars being longitudinally slidable within corresponding slots in said housing, said yoke being connected to said quill through a sliding connection such that a resistive force applied to said yoke by said control means acts substantially axially of said quill with bending moments created on said yoke acting on said housing through said guide bars, said quill being supported by said housing for rotation about its longitudinal axis, and including means interconnecting said yoke to said quill so as to prevent rotation of said quill relative to said housing.

3. The combination as defined in claim 2 including a slot formed longitudinally in said quill and a control key carried by said yoke and received within said longitudinal slot in said quill so as to prevent rotation of said quill.

4. The combination as defined in claim 1 wherein said guide bars are disposed in parallel spaced relation and are disposed on diametrically opposite sides of said housing.

5. The combination as defined in claim 1 wherein said guide slots in said housing have longitudinal axes which lie in a plane containing the longitudinal axis of said spindle, said plane being substantially perpendicular to a second plane containing the axes of said control link means and said spindle.

6. The combination as defined in claim 1 wherein said yoke defines a pair of leg portions which partially encircle said quill, said leg portions being connected to said quill through a pair of axially aligned diametrically opposed connecting pins having sliding connection with said quill.

7. The combination as defined in claim 6 wherein said quill has a pair of diametrically opposed vertically extending slots formed therein, each of said slots receiving one of said connecting pins such that a resistive force applied to said yoke by said control means acts on said quill along its longitudinal axis.

8. The combination as defined in claim 1 wherein said yoke is connected to said control link means through a lost motion connection such that longitudinal movement of said quill under the influence of said fluid pressure means may take place during an initial length of travel of said quill without restrictive forces being applied to said quill by said control means.

9. The combination as defined in claim 8 wherein said control link means includes means thereon selectively adjustable to adjust the extent of lost motion connection between said yoke and said control link means.

* * * * *